(12) United States Patent
Sjostedt et al.

(10) Patent No.: US 8,267,027 B2
(45) Date of Patent: Sep. 18, 2012

(54) SAILBOAT RIGGING SYSTEM AND METHOD OF MANUFACTURE

(75) Inventors: Robbie J. Sjostedt, Foothill Ranch, CA (US); Scott Vogel, Compass Circle, RI (US)

(73) Assignee: Composite Rigging Limited and Company, North Kingstown, RI (US)

( * ) Notice: Subject to any disclaimer, the term of this patent is extended or adjusted under 35 U.S.C. 154(b) by 833 days.

(21) Appl. No.: 12/342,061

(22) Filed: Dec. 22, 2008

(65) Prior Publication Data

US 2009/0158984 A1    Jun. 25, 2009

Related U.S. Application Data

(60) Provisional application No. 61/015,202, filed on Dec. 20, 2007.

(51) Int. Cl.
*B63B 15/02*   (2006.01)
*B63H 9/08*    (2006.01)
*B63H 9/10*    (2006.01)

(52) U.S. Cl. ........................................ 114/111

(58) Field of Classification Search ............... 114/102.1, 114/109, 111, 108–115
See application file for complete search history.

(56) References Cited

U.S. PATENT DOCUMENTS

| 4,512,276 | A | | 4/1985 | Hamann |
| 5,756,206 | A | * | 5/1998 | Davies et al. ................. 428/367 |
| 6,886,484 | B2 | * | 5/2005 | Thomas ........................ 114/108 |
| 7,137,617 | B2 | * | 11/2006 | Sjostedt ........................ 254/199 |
| 7,540,250 | B2 | * | 6/2009 | Sjostedt et al. ............... 114/111 |
| 2004/0154516 | A1 | | 8/2004 | Thomas |

FOREIGN PATENT DOCUMENTS

| FR | 2231264 A | * | 1/1975 |
| FR | 2636301 A1 | * | 3/1990 |
| WO | WO 03/101719 | | 12/2003 |

* cited by examiner

*Primary Examiner* — Ajay Vasudeva
(74) *Attorney, Agent, or Firm* — Christie, Parker & Hale, LLP

(57) ABSTRACT

The invention is a sailboat rigging system and method for forming same. It is formed from a plurality of resin prepreg high strength fiber strands, tows or roving. The fiber are laid out in a preferred rigging configuration with the fiber strands, tows or roving being placed under generally equal tension. The resin in the prepreg fibers bonds the fiber strands, tows or roving to consolidate them together substantially without open spaces therebetween. If desired, the fiber strands, tows or roving can be branched out at branching points to provide for continuous rigging, and selective fibers can be dropped at various sections of the rigging for weight savings.

12 Claims, 6 Drawing Sheets

SAILBOAT RIGGING SYSTEM AND METHOD OF MANUFACTURE

CROSS-REFERENCE TO RELATED APPLICATION(S)

This application claims the benefit of U.S. Provisional Application No. 61/015,202, filed Dec. 20, 2007.

SUMMARY OF THE INVENTION

Product advantages and methods of manufacture for composite sailboat rigging are described in U.S. Pat. Nos. 7,137,617 and 7,540,250, the contents of which are incorporated herein by reference. The products described in the above referenced patent and patent application can utilize pultruded composite rods (typically carbon/epoxy composite) that are made to be as small as possible to eliminate open spaces between the rods and thereby optimize the packing of the rod bundles and minimize the overall cross sectional area of the rod bundles. These products also require an over-wrapping covering, e.g., a Kevlar thread or equivalent, to hold the individual composite rods together.

It would be desirous to further reduce the cross section area for an individual discontinuous rigging member and/or a continuous rigging system by eliminating the interstitial spaces between the pultruded composite rods. This improvement can be accomplished by consolidating the fiber bundles and the resin matrix that holds the fibers together (and protects the fibers from the elements) into a single monolithic tension member or consolidating multiple tension member elements of a continuous rigging system at the same time as tension on all the fibers is equalized. While the invention is particularly useful for producing a sailboat rigging system, where reducing weight and cross-sectional area are very important, the invention would be useful in other applications, including where a smaller profile and reduced weight are important.

DETAILED DESCRIPTION OF THE INVENTION

Sailboat rigging made according to U.S. Pat. Nos. 7,137,617 and 7,540,250 primarily utilize discrete pultruded carbon/epoxy rods for the rigging system strength elements. This present invention utilizes a material commonly known in the composites industry as "prepreg" roving or tow in lieu of pultruded rods. Prepreg roving or tow is a basic building block material for the composites industry. Prepreg tow is different from pultruded rods in that the matrix resin is uncured and unconsolidated prior to final processing. Prepreg tows are individual strands of high strength fibers with the correct resin/fiber ratio to be used to make an efficient composite material for the application at hand. The high strength fiber strands comprise, for example, carbon fiber, aramid fiber, PBO fibers, or can be of other known fibers. Prepreg tow is commonly called "B-Stage product" compared to "C-stage" pultruded rod. Prepreg roving or tow can come with either thermosetting or thermoplastic resin. Hereinafter, the teen prepreg fibers, tows, and roving shall be used interchangeably.

Figure 1:
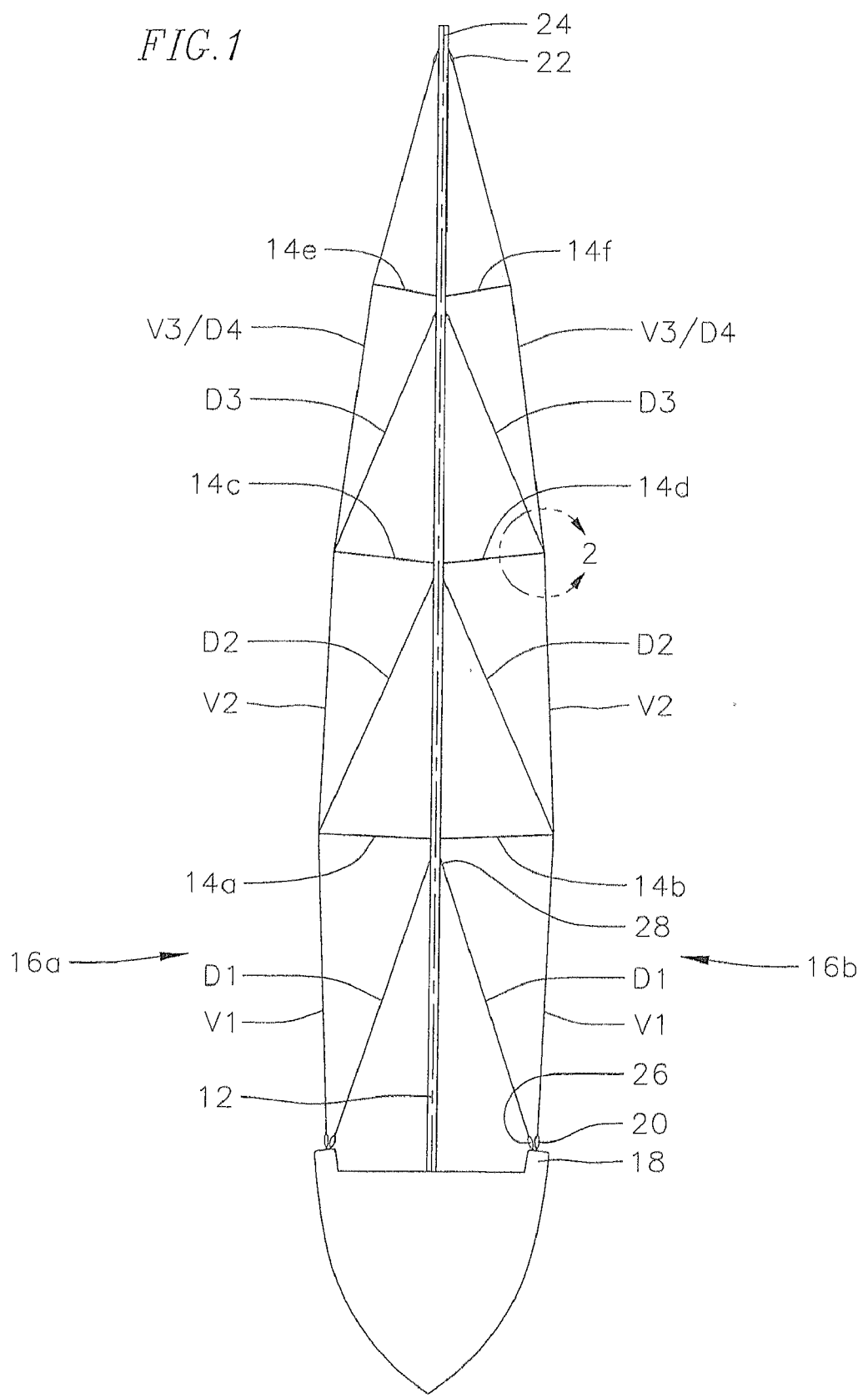
FIG. 1 is a diagrammatic front view of an exemplary layout of a prepreg continuous and discontinuous rigging system of the invention connected to a mast with spreaders in a sailboat application.

Turning now to the drawings, FIG. 1 is a diagrammatic front view of an exemplary layout 10 of a prepreg continuous and discontinuous rigging system of the invention connected to a mast 12 with spreaders 14a-f in a sailboat application. The continuous rigging comprises, for example, left and right side rigging elements 16a and 16b, respectively. In the application shown, the left and right side rigging elements 16a and 16b each comprise generally vertical section V1, which branches into vertical section V2 and diagonal sections D2. Vertical section V2 branches into a terminal section V3/D4 and diagonal section D3. Rigging elements 16a and 16b terminate at the deck 18 with termination fittings 20, and has a termination fitting 22 at the upper end of terminal section V3/D4, which connects near the top of mast 24. A separate diagonal section of rigging D1 can also connect to the deck 18 of hull H with a fitting 26 and at an upper end to the mast 12 with another fitting 28 below where the spreaders 14a and 14b connect to the mast 12. The rigging elements 16a and 16b and separate sections D1 together with the mast 12 and spreaders 14a-f provide a strong structure to support the sails. In actual practice, there is frequently additional rigging that extends between the deck or deck rail, and between masts. However, for simplicity of presentation, this exemplary layout of rigging is used to describe the invention. Hereinafter, the finished rigging formed of consolidated fibers, tows or roving are sometimes referred to herein as strength elements.

In this exemplary embodiment of FIG. 1, the number of fibers in each section of rigging is optimized for strength and weight savings. For example, vertical sectional V1 comprises 317 prepreg fiber strands, vertical section V2 comprises 283 prepreg fiber strands with diagonal section D2 having 101 prepreg fiber strands, and terminal section V3/D4 comprises 233 prepreg fiber strands with diagonal section D3 having 100 prepreg fiber strands. In order to accommodate this, in the transition from D2 and V2 to V1, 67 prepreg fiber strands are removed or dropped, and in the transition from V3/D4 and D3, about 50 prepreg fiber strands are dropped. How this is accomplished is discussed below.

Figure 2:
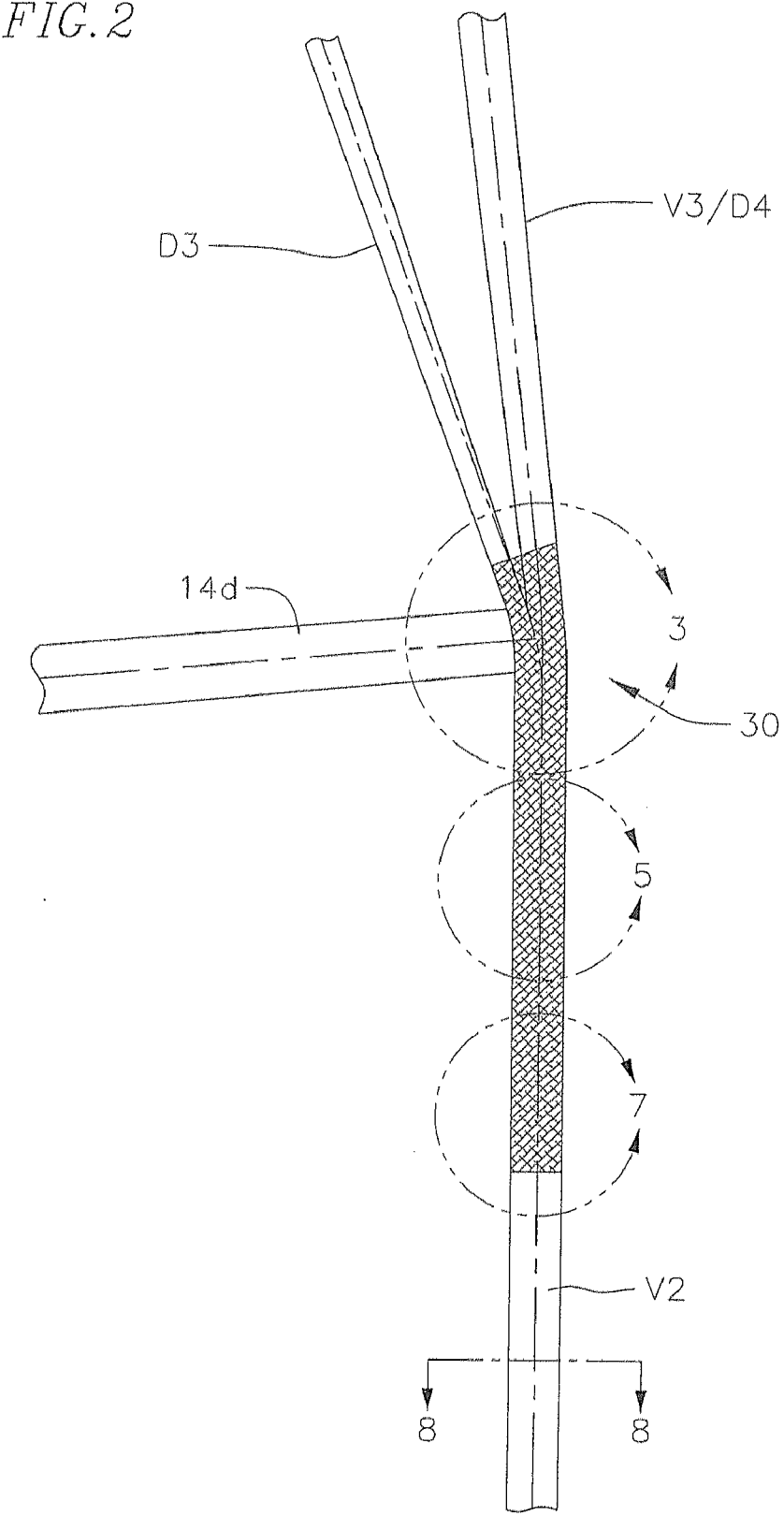
FIG. 2 is a detail of circled area 2-2 of FIG. 1 which shows a selected section of the continuous rigging of the invention.

FIG. 2 is a detail of circled area 2-2 of FIG. 1 which shows a region of the continuous rigging 16a including V2, D3, and V3/D4 in the vicinity of the spreader 14d. Vertical section V2 extends below the spreader 14d, and branches out into diagonal section D3 and terminal section V3/D4 at branch area 30. A portion of vertical section V2 and the branch area 30 is preferably covered with an over-wrapping material 40, e.g., a composite material. The over-wrapping material helps to strengthen the rigging in the branch area 30, and in the transition area where some prepreg fibers are dropped off, the over-wrapping material 40 helps prevent the ends of the dropped off fibers from peeling away from the rest of consolidated fiber bundle, enhances the strength of the dropped fiber terminations, and also supports the curved portion 43 of the diagonal section D3 in the proximity of the split.

Figure 3:
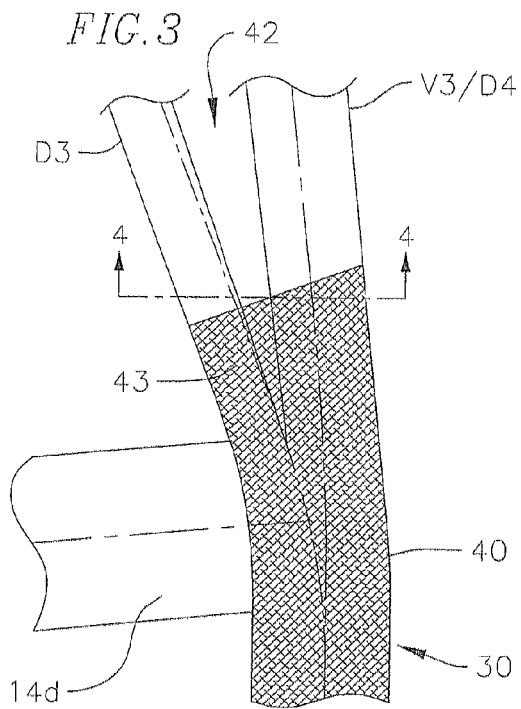
FIG. 3 is a detail of circled area 3-3 of FIG. 2 which shows continuous rigging of the invention in the vicinity of a spreader and splitting off into a generally vertical section and a diagonal section.

FIG. 3 is a detail of circled area 3-3 of FIG. 2 which shows continuous rigging of the invention in the branch area 30 where the generally vertical section V2 branches into diagonal section D3 and terminal section V3/D4. There is a gap 42 where terminal section V3/D4 and diagonal section D3 split off from each other. The over-wrapping material 40 will preferably extend above the point of divergence of D3 and V3/D4 and will help to strengthen the branch area 30 and support the curved portion 43 of diagonal section D3. The connection of the continuous rigging to the ends of the spreaders can be accomplished as described in pending patent application Ser. No. 11/475,464 or by other arrangements and means.

Figure 4:
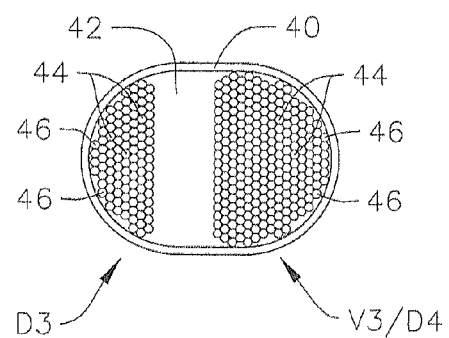
FIG. 4 is a cross-sectional view through view lines 4-4 of FIG. 3.

FIG. 4 is a cross-sectional view through view lines 4-4 of FIG. 3, and shows generally vertical section V3/D4, the diagonal section D3, the gap 42 therebetween, and the over-wrapping materials 40. As shown, the rigging sections are made up of fibers or tows 44 and 46 that have been consolidated together. Fibers 46 comprise those fibers that will be dropped off from the consolidated rigging in a transition area 50, as best shown in FIG. 7.

Figure 5:
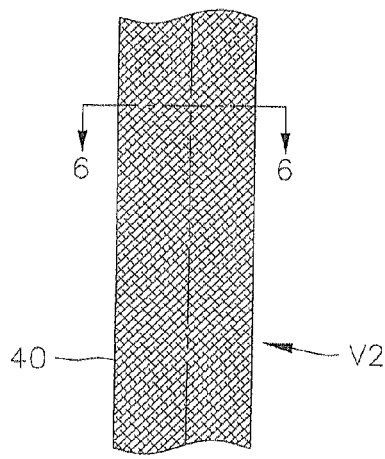
FIG. 5 is a detail of circled area 5-5 of FIG. 2 which shows a portion of the continuous rigging of the invention below the spreader before any fibers are dropped off.

FIG. 5 is a detail of circled area 5-5 of FIG. 2 which shows a vertical section of continuous rigging V2 below the spreader 14D that is covered with over-wrapping materials 40 and with a constant number of fibers (not shown).

Figure 6:
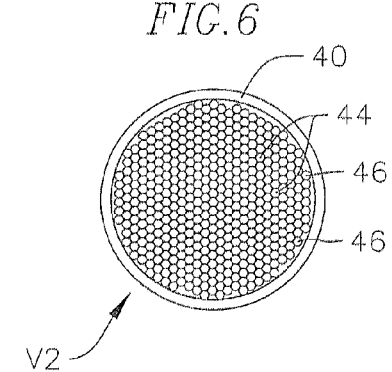
FIG. 6 is a cross-sectional view through view lines 6-6 of FIG. 5.

FIG. 6 is a cross-sectional view through view lines 6-6 of FIG. 5 and shows a plurality of prepreg fibers 44 that have been consolidated into the continuous rigging without gaps therebetween and the over-wrapping material 40. In this exemplary embodiment of FIG. 1, the number of fibers in each section of rigging is optimized for strength and weight savings. As noted above, in this example, vertical section V2 has 283 prepreg fiber strands, diagonal section D3 has 100 prepreg fiber strands and the terminal section V3/D4 has 233 prepreg fiber strands. In order to achieve the transition from V3/D4 and D3 to V2, 50 prepreg fiber strands are dropped. How this accomplished is discussed below.

Figure 7:
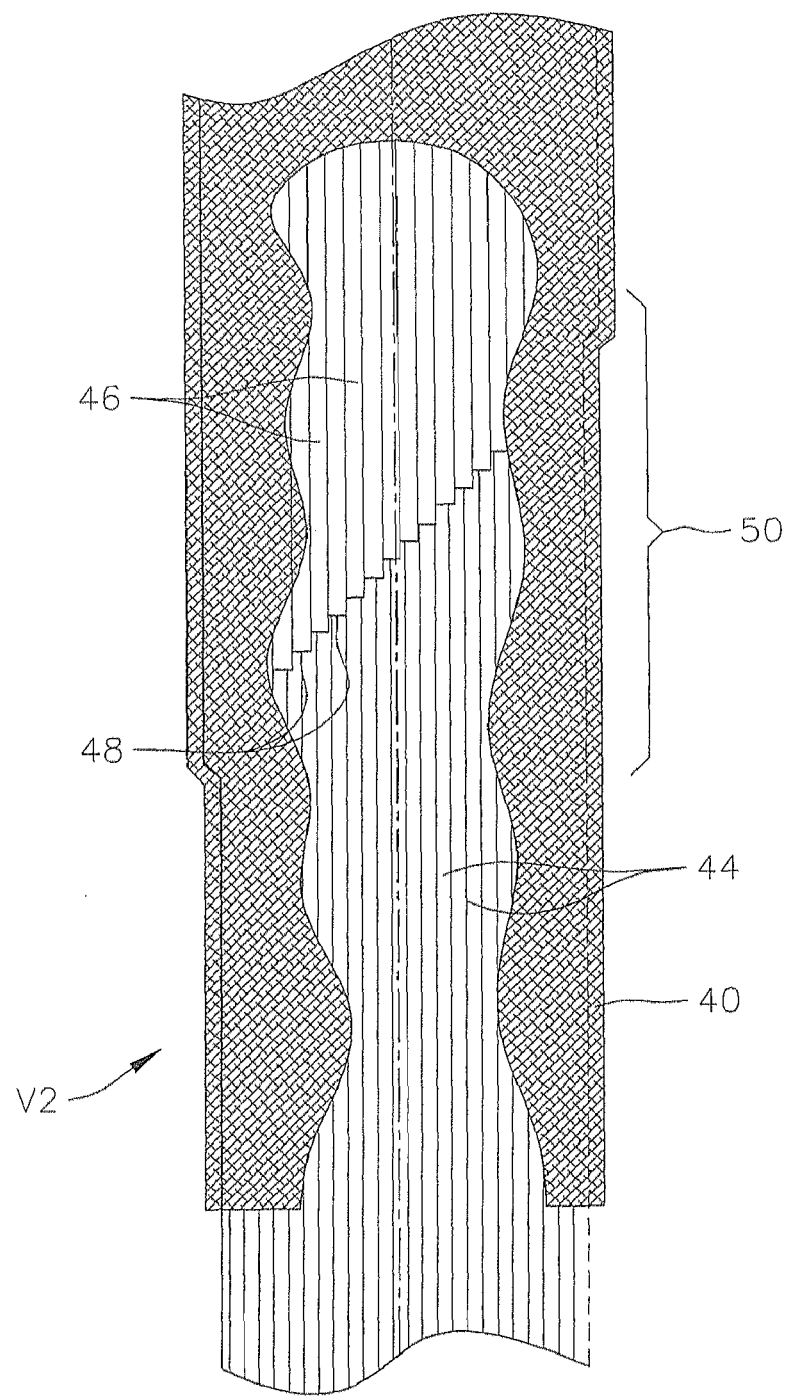
FIG. 7 is a partially exposed detail of circled section 7-7 of FIG. 2, showing a section of continuous rigging where some fibers are dropped off.

FIG. 7 is a partially exposed detail of circled area 7-7 of FIG. 2, showing a vertical section of rigging V2 where some fibers 46 are cut off ("dropped off") in a transition area 50 so as not to extend further downwardly below the transition area 50. Although the dropped off fibers 46 are shown as cut off in a slanted orientation, the cut off line can be horizontal, or cut in some other orientation. The over-wrapping material 42 will preferably extend over the fibers 46 that are cut off and extend further below the transition area 50 so that the free ends 48 of dropped off fibers 46 will not have a chance to peel off from each other or from the other prepreg fibers 44.

Figure 8:
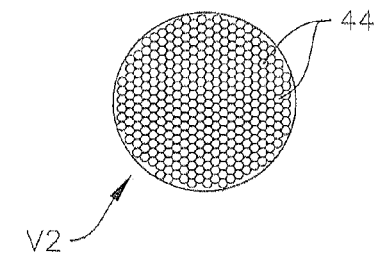
FIG. 8 is a cross-sectional view through view lines 8-8 of FIG. 2 below where fibers have been dropped off.

FIG. 8 is a cross section view through lines 8-8 of FIG. 2 and show the smaller diameter cross-section of the vertical section of rigging V2 below where fibers 46 have been dropped off compared to where fibers 46 are not dropped off, as shown in the cross-sectional view of FIG. 6. In this area, there are just consolidated fibers 44, and there is no over-wrapping material.

Figure 9:
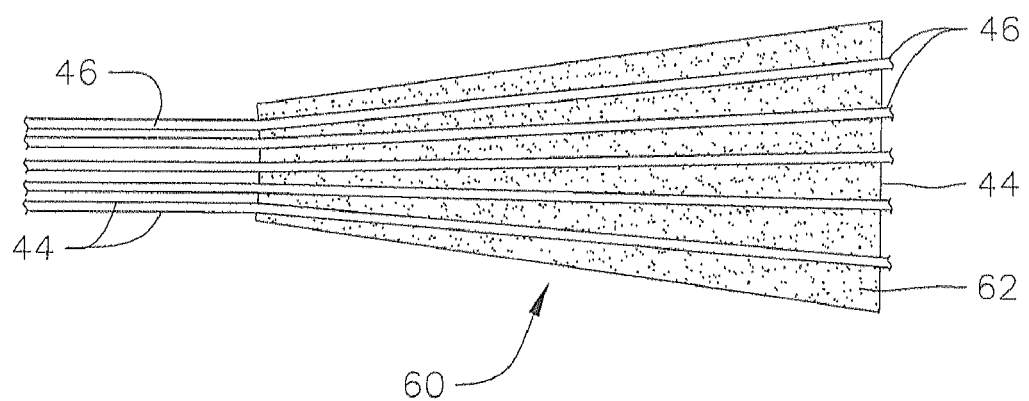
FIG. 9 is a cross-sectional view of an exemplary terminal cone into which the equally tensioned fibers, tows or roving are bound into.

FIG. 9 is a cross-sectional view of an exemplary terminal cone 60 into which the equally tensioned 44, 46 are located, with the additional resin and short fiber mix 62 injected therein. This exemplary terminal or "terminus" cone 60 will prevent the strength element fibers, tows or roving from pulling through. However, other types of terminating fitting can be used.

The method of manufacture of a discontinuous or continuous sailboat rigging system utilizing B-Stage prepreg strength elements versus C-Stage strength elements requires that the strength elements be consolidated and cured in the case of thermosetting prepreg as a rigging member or system rather than by pre-pultruding the individual rods and assembling the tension member or rigging system into the preferred rigging configuration. In the case of thermoplastic prepreg, the rigging member or rigging system is heated, consolidated and cooled because no polymer cross-linking is required as in the case of thermosetting prepreg. Whatever resin is used, it can preferably include a UV protective additive to enhance weathering resistance of the finished product. For example, compounds such as carbon black, titanium dioxide and chemical UV light stabilizer additives can be mixed in the resin used to impregnate the fibers. The prepreg strength elements for this invention are made into either a discontinuous or a continuous rigging system using some of the same steps as described in U.S. Pat. No. 7,137,617.

Figure 10:
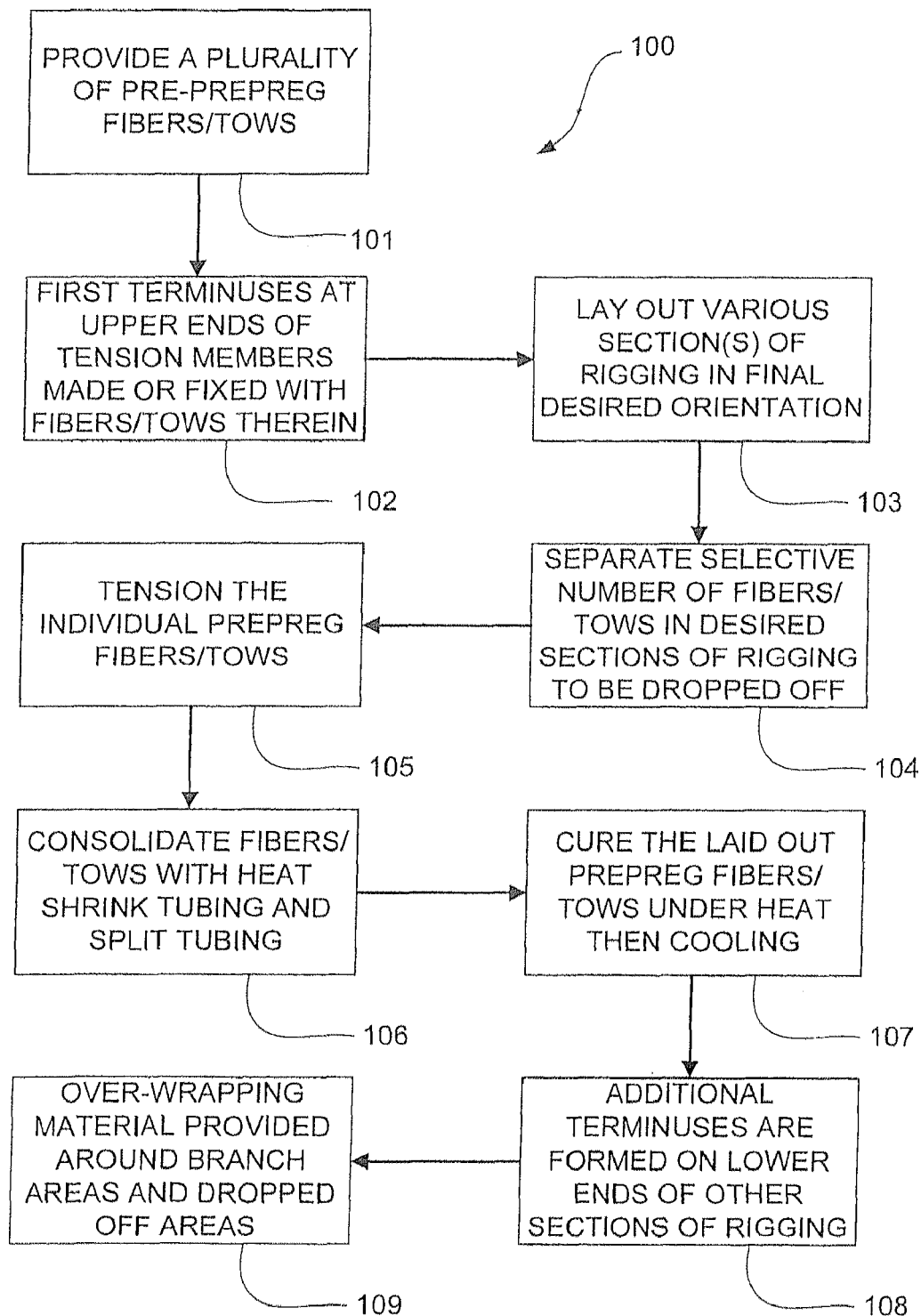
FIG. 10 is a flowchart showing an exemplary method for forming prepreg composite material discontinuous and continuous sailboat rigging.

Turning to FIG. 10, there is shown an exemplary flowchart 100 of the method of forming a continuous rigging system of prepreg fibers, tows or roving. In a first step 101, a plurality of prepreg high strength fibers, tows, or roving are provided. Next, in step 102, a first terminating fitting (e.g. 20 of FIG. 1) at one end of the rigging system is made or fixed to the individual prepreg fibers or tows. In continuous rigging with multiple branches, termination fittings are made at all upper ends of the strength elements. Either before or after this, in step 103, the various sections of the rigging system are laid out along the path and orientation they will take during installation on a sailboat using tooling, e.g., on a work table or jig. In optional step 104, if it is desired to drop off thereby removing a portion of some prepreg fibers or tows, then some fibers are identified to be dropped off. This can be accomplished by placing a layer of non stick film between where the fibers or tows will be dropped off and those remaining tows which will not be eliminated, tensioning all fibers, curing all the fibers/tows into a consolidated bundle, and then cutting the fibers/tows to be dropped off and discarding same. This optional dropping off step is discussed in more detail below. In step 104, the prepreg fibers or tows must be individually tensioned, e.g. by applying weights or tension springs, for example, as in the manner shown in U.S. Pat. No. 7,137,617 and patent application Ser. No. 11/475,464, in order to equalize the load carrying ability of all fibers or tows. At this point, in step 106, the prepreg tow can be cured or consolidated. There are various ways to do this, some of which are noted below. Thereafter in step 107, the consolidated bundles of fibers or tows are heated to cause the resin in the fibers or tows to meld and bind together all the fibers or tows tightly without spaces therebetween. Polymerization and cooling follows to solidify the rigging. The fibers that have been identified in step 104 are now removed as described above. In step 108, the additional tension member terminating fittings are created at the other ends of the rigging. The additional tension member terminuses can be formed before or at the same time as the prepreg fibers or tows are consolidated and cured along their main lengths, provided that the additional terminal cones are injected right at the point where the curing process has reduced the prepreg resin viscosity to its lowest point prior to gelation and polymerization, as discussed further below. Optionally, in step 109, for added strength and to prevent possible peeling away of dropped off fibers or tows, an overwrapping material 40, such as shown in FIGS. 2-7, can be formed around branch areas and transitions areas where fibers or tows are dropped off.

When subjected to heat, a thermosetting prepreg resin first drops in viscosity, where it basically goes back to A stage condition and then starts to gel or polymerize. (A-stage condition is an early stage of polymerization of thermosetting resins in which the material is still soluble in certain liquids and is fusible. It is also called resole). It is desirable for the resin to go A-stage so that weights (or other tensioning means) are effective to tension the prepreg fibers or tow elements. At that time, the resin/fiber matrix for the cone of the additional termination fittings can be injected. In order to help ensure good consolidation and to achieve the desired end product, the bundle of prepreg fibers or tows that will make up the strength element bundles may be wrapped with a heat sensitive shrink film to provide consolidation pressure. A split silicone rubber tube or the like can also be used underneath the shrink film wrap to minimize imprint of the shrink film into the tension member. Autoclave curing is also applicable. A custom extruded elastomeric material tube can also be used in conjunction with the shrink film, in lieu of the split silicone tubing, to shape the pre-impregnated thermosetting or thermoplastic tension member bundle into an optimized streamlined cross sectional shape to further reduce wind drag. If it is desired to provide rigging sections with special shapes, such as oval or air foil shapes, in this step the rigging can be cured and shaped as desired.

As noted above, for continuous rigging with multiple branches and ends, the tension of the prepreg tows in each branch of the multiple branches should be equalized in the preferred rigging configuration, e.g., laid out along the same path it will follow when it is installed on a sailboat. The result is a tension member monolithic composite round or shaped bar or a series of round or shaped bars that has the optimal ratio of fiber and resin, with all fiber strength elements equally tensioned and fully consolidated into a minimum cross section rigging member or plurality of integrated rigging members in the preferred rigging configuration.

Depending on the needs of a particular application, different sections of rigging can include different numbers and/or types of fibers or tows, as described with the rigging of FIGS. 1-8 above. For example, if there is a need for greater strength at a top section of rigging, a larger number of tows and/or thicker tows can be used in that region. Also, if desired, it is possible to combine different types of tows (e.g., different fibers and/or different resins) in a single rigging arrangement.

In U.S. Pat. No. 7,137,617 and patent application Ser. No. 11/475,464, pultruded rod strength elements are terminated by secondary bonding them in a terminus cone while under equal tension. In this present invention, the prepreg tow is preferably co-cured with a terminus cone using fiber-filled thermosetting resin materials. The resin that is injected into the terminus cone mold is compatible with the pre-preg resin (e.g., both are epoxy). The co-curing process results in a higher strength bond of the strength element fibers to the cone material than can be achieved by secondary bonding. The fiber elements and terminus cone can also be made using thermoplastic materials. In this case, the cone material must be injection molded around the thermoplastic prepreg fibers, roving, or tows, after which the terminus cone and the thermoplastic prepreg fiber, roving, or tows of the strength member are heated and then cooled to consolidate and process the thermoplastic. Whatever type of material used, there would preferably not be mixing of thermosetting and thermoplastic materials, e.g., if the prepreg is epoxy then the terminus cone should be epoxy, and if the prepreg is thermoplastic, then the terminus cone should be the same or any suitable engineering thermoplastic. The resin systems that can be used for a thermoplastic product are polyetheretherketone (PEEK), polyphenylenesulphone (PPS) or polyether imide (PEI). While these particular methodologies and design to provide terminations to the tension members are quite functional, the invention is not limited to these particular designs and methods for terminating the strength members.

In the manufacturing process using thermosetting resin prepreg tows, an insulated blanket is draped over the work table for a discontinuous rigging member or a continuous rigging system to make what is commonly known as a "tent oven". Hot air is introduced into the tent oven. When the prepreg fibers or tows reach about 49 degrees C. (120 degrees F.) temperature, the thermosetting uncured epoxy resin changes from a viscous and tacky B-stage resin form to a low viscosity liquid form. Tension weights, tension springs, or other means are used to equalize the tension on all tow fibers, and are effective at this point of the process. Concurrently, the shrink film reacts to the heat and compacts and consolidates the fiber bundle. Additional heat and time results in polymerization of the prepreg resin. At this same time, cone resin is injected into the additional terminations. When the entire assembly is fully cured, the tent oven, weights and shrink film are removed. The epoxy prepreg undergoes a transistion as it is heated. First, the B Stage resin drops in viscosity. This is the time that the prepreg tow elements will slip relative to each other due to the weights that are attached at the second terminus. When the prepreg tows are "layed up" in the desired rigging configuration in the B Stage condition, the tows are sticky and it can be very difficult to get every tow element evenly tensioned. However, when the prepreg is subjected to about 49 degrees C. to about 66 degrees C. (about 120 degrees F. to 150 degrees F.) temperature, it reverts to A-Stage condition and the resin has a very low viscosity. This is the time that the weights are effective and function to place equal tension on every tow element with the rigging element under manufacture in the desired layout. The shrink film does not constrict down to compact the fibers into a bundle until a higher temperature (typically above 82 degrees C. (180 degrees F.)). It is desirable to avoid bundle compaction until after the weights have effectively equally tensioned all the fibers. The tent oven will be held at about 49 degrees C. (120 degrees F.) for some time to allow the weights to cause the fibers to be placed under equal tension. Thereafter, the temperature is ramped up to (e.g., to about 82 degrees C. (180 degrees F.) to shrink the shrink film and consolidate the bundle into a round (or shaped package) and then the tent oven is raised to about 121 degrees C. (250 degrees F.) to cure the epoxy and lock the whole bundle together in the C-Stage or fully cured condition. The additional termination fittings can be injected anytime after the weights have become effective and evenly tensioned the strength element tow bundle. The additional termination fittings are preferably injected when the prepreg is in the A-Stage or B-Stage condition but not when it is fully cured.

The prepreg strength elements are consolidated and either a matrix of thermosetting resin is heat cured or a thermoplastic resin is heated/chilled when tension is equalized on the prepreg fiber strands. This method of tensioning and heat curing or heat/chill consolidating either discontinuous or continuous rigging members can also be accomplished in a traditional oven or autoclave. As noted above, the nature of the terminal fitting can be different than noted in U.S. Pat. No. 7,137,617 or patent application Ser. No. 11/475,464.

The process for manufacture of thermoplastic rigging members and rigging systems uses the oven in like manner but after the thermoplastic prepreg reaches the desired processing temperature, the matrix resin flows. This allows the tension weights or other tension means to perform their function of placing predetermined tensions on the tows to equalize the tension of various sections of the rigging as the rigging will be laid out as it will be installed in its preferring rigging configuration. The heat source is then stopped and the assembly is allowed to cool down to room temperature. During this cool down, the thermoplastic resin solidifies and locks the tow bundles in the appropriate orientation with the individual tows under equal tension and in the preferred rigging configuration. It is at this time that the final terminus cone is injection molded.

It is further possible to drop-off or taper prepreg strength elements down the length of the cathedral rigging system for continuous rigging configurations to further reduce weight and cross-section area. The overall mast and rigging tension member configuration for racing and cruising sailboats is tailored to meet the strength and support requirements of the boat design and to optimize the boat relative to the racing rules. The design optimization process can result in mast and rigging load cases that present challenges to the basic concepts taught in pending patent application Ser. No. 11/475,464 (where all fiber strength elements of the rigging system terminate either at deck level or somewhere along the length of the mast in a linear manner). Furthermore, in sailboat rigging design, it is necessary to calculate the strength element requirements at multiple load cases. These design requirements or load cases are driven by the overall sailboat design and sail configurations. The sail configuration is variable dependent on weather conditions. The maximum strength and stiffness requirement for each element may not occur in the same load case, however, each element must be sized for its maximum requirement. If all the required upper rigging system fiber strength elements are carried all the way down to the vessel deck level as taught in application Ser. No. 11/475,464, there would be greater than optimal rigging weight and rigging cross section for some vessels or applications. Use of prepreg strength elements that are co-consolidated and cured via this invention allows strength elements to be dropped-off at various points along the rigging system height without introducing additional fitting terminations.

The prepreg fiber strength elements to be terminated or dropped-off (without fittings) before deck level (be it diagonal or vertical tension members) must be equally tensioned where they pass over the end of a spreader member or along the length of a tension member as taught in U.S. Pat. No. 7,37,617 and Ser. No. 11/475,464. After tensioning, the prepreg strength element portions to be removed from the rigging system are separated from the rest of the strength element bundle, for example, by use of a separator film below the termination zone (see FIG. 7) during consolidation and/or curing. The fiber portions that are to be removed need to be tensioned in the same fashion as the ones that will remain. Since this is done during the curing process the fibers that will be cut out need to be kept separate from the others. The separator film allows them to be stripped off the remaining bundle after cure. By this approach, the strength elements not needed below the fitting-less termination can be cut out of the rigging system after curing. The strength elements not needed simply bypass the lower terminal and are tensioned in the same manner as those strength elements going through the terminal. This is consistent with the need to tension the elements that are going to be removed. Since the termination is co-cured, the elements being dropped out are kept out of the cone by bypassing it. The portion of the dropped-off strength elements that are to be retained in the rigging system co-cured or co-consolidated with the rest of the strength elements in the area of the fitting-less termination. The termination is accomplished by the interlaminar bond of the retained portion of the dropped-off strength elements to the strength elements that continue to deck level. This termination is inherently strong because the stress placed on each prepreg tow element and the strength capability of each prepreg strength element in the finished rigging is relatively low compared to its bonded surface area strength.

To further enhance the strength and reliability of the termination area for the dropped-off strength elements, the composite strength element bundle can be over-wrapped with composite woven cloth and resin or resin impregnated circumferential fibers to prevent potential peel of the tension member strength elements in the area of the termination under extreme load. This over-wrap can also perform a second function in the area of the spreader acting as a support member enhancing the strength of the rigging system. The composite over-wrap can double as a supporting member for strength element bundles that pass over the spreader and become diagonal tension members. In this case, the minimum bend radius for the included angle change for a diagonal tension member may be larger than the desirable supporting spreader end. As a result, the diagonal tension member may have a slight curvature due to the bend radius just above the spreader. Any curvature or bend in the tension member, no matter how slight, must be supported or there will be unequal loading or even compression on one side of the tension member under load which could result in a reduced safety factor or potential structural failure. The over-wrap can be applied in a secondary operation either by wrapping the area with a reinforcing cloth, winding with unidirectional tow or applying a braided sock. The over-wrap laminate configuration, size, and thickness is tailored to meet the strength and support requirements.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention.

What is claimed is:

1. A sailboat rigging system comprising:
elongate rigging comprising a plurality of high strength fiber strands, tows or roving, and resin, wherein the fiber strands, tows or roving are laid out in a preferred rigging configuration with the fiber strands, tows or roving being placed under generally equal tension, and with the resin cured together with fiber strands, tows or roving to consolidate them together substantially without open spaces therebetween, wherein the preferred rigging configuration includes a branching region having an upper region and a lower region, with a plurality of elongate branching sections extending into the upper region of the branching region and merging into a single elongate section which extends downwardly from the lower region of the branching region, and with the fiber strands, tows or roving in the branching region being under generally equal tension.

2. The sailboat rigging system of claim 1, wherein the resin is thermosetting polymer resin and/or thermoplastic resin.

3. The composite rigging system of claim 2, wherein the thermosetting and/or thermoplastic polymer resin includes a UV protective additive to enhance weathering resistance.

4. The sailboat rigging system of claim 1, wherein the high strength fiber strands, tows, or roving are initially pre-impregnated with the resin in an uncured form.

5. The sailboat rigging system of claim 1, wherein the resin comprises epoxy.

6. The sailboat rigging system of claim 1, wherein the high strength fiber strands are selected from the group consisting of carbon fibers, aramid type fibers and/or PBO fibers.

7. The sailboat rigging system of claim 1, further comprising a terminating cone at least at one end of the elongate rigging into which the fiber strands, tows or roving are consolidated along with a mix of additional resin and short fibers.

8. The sailboat rigging system of claim 7, wherein the resin is pre-impregnated in the high strength fiber strands, tows or roving, and wherein when the resin is thermosetting resin, is co-cured, and wherein when the resin is thermoplastic resin, is co-processed, at the same time with the additional termination resin and short fiber mix, thereby enhancing adhesive bonding of the terminating cone and the fibers strands, tows or roving by eliminating secondary bonding.

9. The sailboat rigging system of claim 1, wherein a sum of the number of fiber strands, tows or roving in the plurality of elongate sections that extend from the upper area of the branching region is greater than the number of fiber strands, tows or roving in the single elongate section that extends from the lower region of the branching region, with a difference between the number of fiber strands, tows or roving in the plurality of elongate sections that extend from the upper area and the number of fiber strands, tows or roving in the single elongate section be accommodated by dropping off fiber strands, tows or roving at a drop-off region on the single elongate section.

10. The sailboat rigging system of claim 9, further comprising over-wrapping material that covers the consolidated fiber strands, tows or roving and resin in the branching region and the drop-off region.

11. A sailboat rigging system comprising:

elongate rigging comprising a plurality of ends and a plurality of high strength fiber strands, tows or roving, and uncured thermosetting polymer resin and/or thermoplastic resin, wherein the fiber strands, tows or roving are laid out in a preferred rigging configuration with the fiber strands, tows or roving being placed under generally equal tension, and with the resin cured together with fiber strands, tows or roving to consolidate them together substantially without spaces therebetween, wherein the preferred rigging configuration includes a branching region having an upper region and a lower region, with a plurality of elongate branching sections extending into the upper region of the branching region and merging into a single elongate section which extends downwardly from the lower region of the branching region, and with the fiber strands, tows or roving in the branching region being under generally equal tension; and a terminating cone at least at one end of the elongate rigging into which the fiber strands, tows or roving are consolidated along with additional resin.

12. The sailboat rigging system of claim 11, wherein a sum of the number of fiber strands, tows or roving in the plurality of elongate sections that extend from the upper area of the branching region is greater than the number of fiber strands, tows or roving in the single elongate section that extends from the lower region of the branching region, with a difference between the number of fiber strands, tows or roving in the plurality of elongate sections that extend from the upper area and the number of fiber strands, tows or roving in the single elongate section accomplished by dropping off fiber strands, tows or roving at a drop-off region on the single elongate section.

* * * * *